(12) United States Patent
Xiong

(10) Patent No.: US 12,366,284 B2
(45) Date of Patent: Jul. 22, 2025

(54) BELT TENSIONING MECHANISM FOR 3D PRINTER AND 3D PRINTER

(71) Applicant: SHENZHEN TUOZHU TECHNOLOGY CO., LTD., Shenzhen (CN)

(72) Inventor: Xianwu Xiong, Shenzhen (CN)

(73) Assignee: SHENZHEN TUOZHU TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/460,588

(22) Filed: Sep. 4, 2023

(65) Prior Publication Data

US 2023/0407946 A1 Dec. 21, 2023

Related U.S. Application Data

(63) Continuation of application No. PCT/CN2022/120915, filed on Sep. 23, 2022.

(30) Foreign Application Priority Data

Oct. 19, 2021 (CN) .......................... 202122512256.9

(51) Int. Cl.
*F16H 7/12* (2006.01)
*B22F 12/00* (2021.01)
(Continued)

(52) U.S. Cl.
CPC ......... *F16H 7/1263* (2013.01); *B22F 12/222* (2021.01); *B22F 12/30* (2021.01);
(Continued)

(58) Field of Classification Search
CPC ..... F16H 7/1263; F16H 37/065; B33Y 30/00; B29C 64/232; B29C 64/245; B22F 12/222; B22F 12/30
See application file for complete search history.

(56) References Cited

U.S. PATENT DOCUMENTS

2016/0144564 A1* 5/2016 Padgett ................. B29C 64/209
425/113

FOREIGN PATENT DOCUMENTS

| CN | 206939988 U | * | 1/2018 |
| CN | 213472205 U | | 6/2021 |

OTHER PUBLICATIONS

International Search Report of PCT/CN2022/120915.

* cited by examiner

*Primary Examiner* — Randell J Krug
(74) *Attorney, Agent, or Firm* — KILPATRICK TOWNSEND & STOCKTON LLP

(57) ABSTRACT

Some embodiments provide a belt tensioning mechanism for a 3D printer and a 3D printer. In those embodiments, the belt tensioning mechanism comprises a base, a driving pulley, at least one timing pulley, a sliding block, a tensioning pulley, a spring. The base is provided with a first sliding groove. The driving pulley and the at least one timing pulley are mounted on the base and are connected in series with each other via a belt. The sliding block is mounted on the base and is capable of sliding along the first sliding groove. The tensioning pulley is mounted on the sliding block and is connected in series with the driving pulley and the at least one timing pulley via the belt so as to tension the belt. The spring is configured to apply an elastic force to the sliding block.

12 Claims, 4 Drawing Sheets

(51) Int. Cl.
  *B22F 12/30* (2021.01)
  *B29C 64/232* (2017.01)
  *B29C 64/245* (2017.01)
  *B33Y 30/00* (2015.01)
  *F16H 37/06* (2006.01)
  *F16H 7/08* (2006.01)

(52) U.S. Cl.
  CPC .......... *B29C 64/232* (2017.08); *B29C 64/245* (2017.08); *B33Y 30/00* (2014.12); *F16H 37/065* (2013.01); *F16H 2007/0806* (2013.01); *F16H 2007/0808* (2013.01); *F16H 2007/081* (2013.01); *F16H 2007/0842* (2013.01); *F16H 2007/0865* (2013.01); *F16H 2007/0872* (2013.01); *F16H 2007/0891* (2013.01); *F16H 2007/0897* (2013.01)

BELT TENSIONING MECHANISM FOR 3D PRINTER AND 3D PRINTER

CROSS-REFERENCE TO RELATED APPLICATIONS

This application is a continuation of International Patent Application No. PCT/CN2022/120915, filed on Sep. 23, 2022, which claims priority to Chinese Patent Application No. 202122512256.9, filed on Oct. 19, 2021. The disclosures of the aforementioned applications are hereby incorporated by reference in their entireties.

TECHNICAL FIELD

The present disclosure relates to three-dimensional (3D) printing technology, and in particular to a belt tensioning mechanism for a 3D printer and a 3D printer.

BACKGROUND

A 3D printer, also known as a three-dimensional printer, is a machine that uses bondable materials such as powdered metals or plastics to construct a 3D object by layer-by-layer printing based on rapid prototyping technology. In the related art, during the printing process of a 3D printer, the printing bed, which supports the printing material, moves vertically under the action of the belt through lead screws and timing pulleys.

In the related art, the timing belt requires manual tensioning by the user using bolts. Different users may set different tension positions, resulting in inconsistent belt tensions among different machines, which can lead to reduced precision in the vertical movement of the printing bed or increased machine wear.

SUMMARY

It would be advantageous to provide a mechanism that alleviates, mitigates, or even eliminates one or more of the above-mentioned problems.

According to an aspect of the present disclosure, provided is a belt tensioning mechanism for a 3D printer, wherein the 3D printer comprises at least one lead screw arranged in a vertical direction and a printing bed sleeved on the at least one lead screw. The belt tensioning mechanism comprises: a base provided with a first sliding groove; a driving pulley and at least one timing pulley mounted on the base and connected in series with each other via a belt, wherein the at least one timing pulley is configured to drive the at least one lead screw to rotate under the driving of the driving pulley so as to enable the printing bed to move up and down relative to the base along the at least one lead screw; a sliding block mounted on the base and capable of sliding along the first sliding groove; a tensioning pulley mounted on the sliding block and connected in series with the driving pulley and the at least one timing pulley via the belt so as to tension the belt; a spring configured to apply an elastic force to the sliding block to make the siding block at a working position within the first sliding groove, wherein at the working position, the tensioning pulley tensions the belt; a tensioning pulley cover fixedly mounted on the base and provided with a second sliding groove corresponding to the first sliding groove; and a locking screw passing through the second sliding groove and being in threaded connection with a threaded hole in the sliding block, such that the sliding block is locked and fixed relative to the tensioning pulley cover.

According to another aspect of the present disclosure, provided is a 3D printer, comprising: at least one lead screw arranged in a vertical direction, a printing bed sleeved on the at least one lead screw, and the above belt tensioning mechanism.

These and other aspects of the present disclosure will become clear on the basis of the embodiments described hereinafter, and will be illustrated with reference to the embodiments described hereinafter.

BRIEF DESCRIPTION OF THE DRAWINGS

Further details, features, and advantages of the present disclosure are disclosed in the following description of exemplary embodiments in conjunction with the accompanying drawings. In the accompanying drawings.

DETAILED DESCRIPTION

In the present disclosure, unless otherwise specified, the terms "first", "second", etc., are used for describing various elements and are not intended to define a positional relationship, a temporal relationship, or an importance relationship of these elements, and such terms are used only for distinguishing one element from another. In some examples, a first element and a second element may refer to the same instance of the element, while in some cases they may refer to different instances based on the context of the description.

The terms used in the description of the various described examples in the present disclosure are for the purpose of describing particular examples only and are not intended to be limiting. Unless otherwise clearly indicated in the context, if the number of elements is not specifically limited, there may be one or a plurality of elements. As used herein, the term "plurality" means two or more, and the term "based on" should be construed as "based, at least in part, on". Furthermore, the terms "and/or" and "at least one of" encompass any of and all possible combinations of the listed items.

Exemplary embodiments of the present disclosure will be described in detail below with reference to the accompanying drawings.

In the related art, a belt tensioning mechanism for a 3D printer generally comprises a tensioning pulley, a sliding block, a belt, and a bolt. The tensioning pulley is mounted on the sliding block, and the sliding block is provided with threads that connect to the bolt. When the belt becomes loose after long-time use, the user is required to manually rotate the bolt. The bolt drives the idler sliding block to move along the axis of the bolt, thereby tensioning the timing belt. In such a solution, it relies on the user to manually tension the timing belt by screwing the bolt, and the final tension force is completely controlled by the user's sense of feeling. Different users apply different torque to the bolt, resulting in inconsistent belt tension among different machines. When the belt is too loose, it may cause a hidden danger of inconsistencies in the vertical movement of the heated bed table when the machine is in operation. When the belt is too tight, it may increase the overall transmission resistance and exacerbate machine wear.

In view of this, the embodiments of the present disclosure provide a belt tensioning mechanism for a 3D printer. The belt tensioning mechanism utilizes a spring to provide a relatively constant tension force, eliminating the need for users to rely on their sense of feelings to determine the tension force. This helps to avoid issues arising from inconsistent tension forces.

Figure 4:
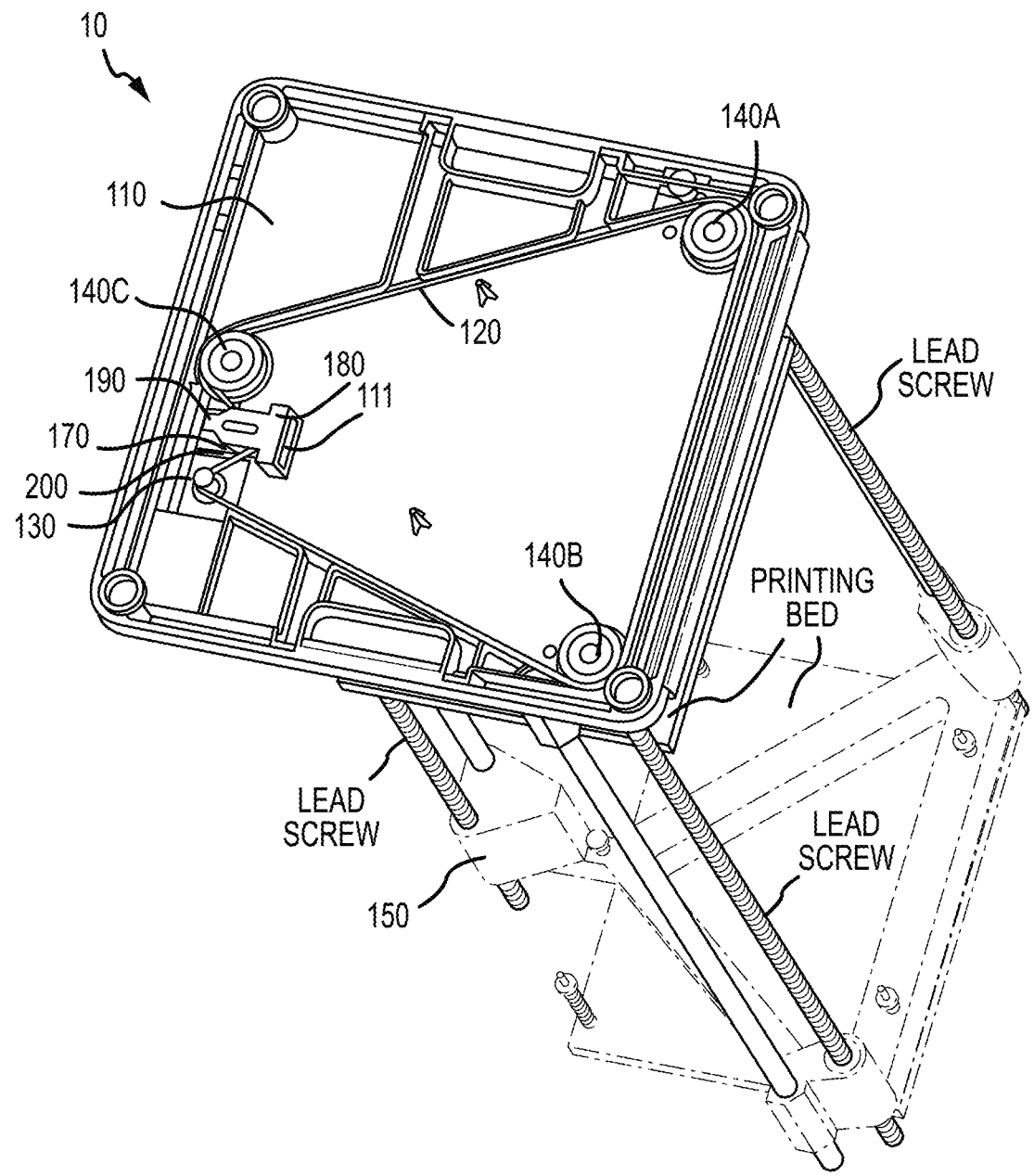
FIG. 4 shows a schematic structural diagram of a 3D printer according to an embodiment of the present disclosure.

FIG. 4 shows a schematic structural diagram of a 3D printer according to an embodiment of the present disclosure. As shown in FIG. 4, the 3D printer can comprise at least one lead screw arranged in a vertical direction and a printing bed sleeved on the at least one lead screw.

Figure 1:
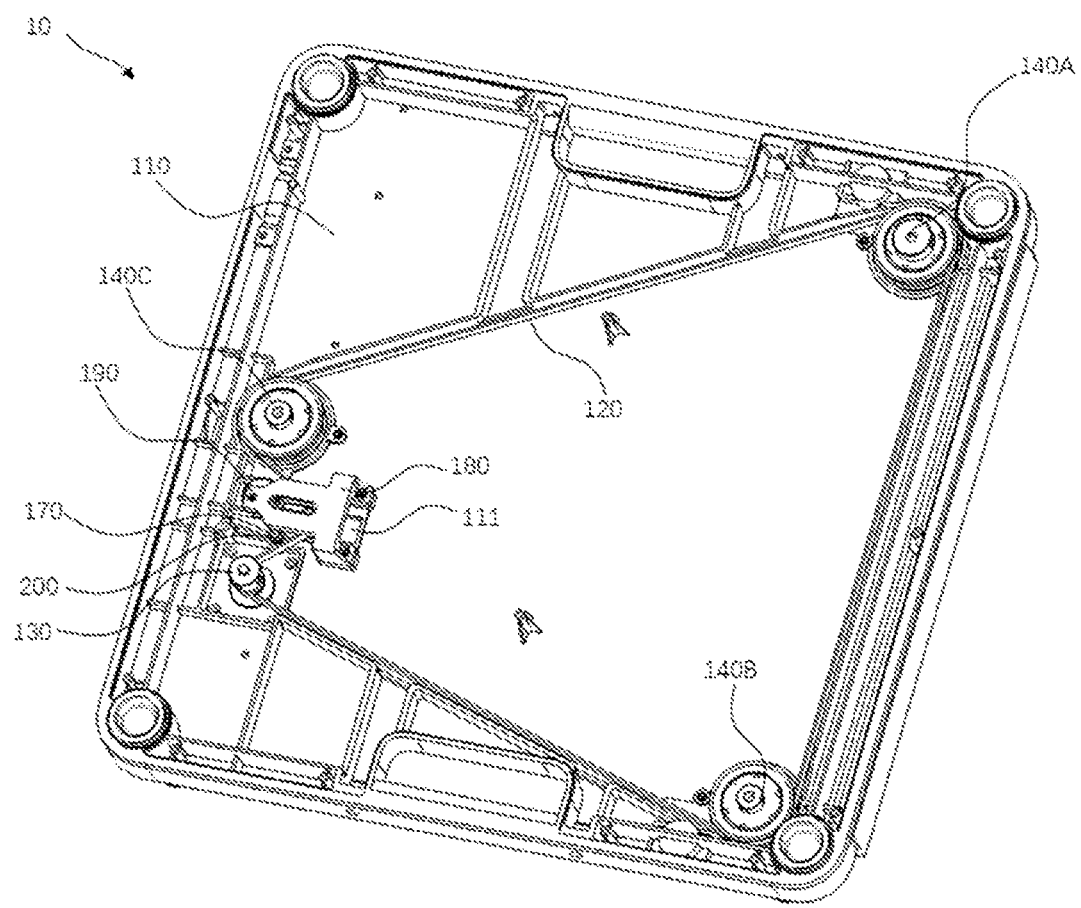
FIG. 1 shows a schematic structural diagram of the belt tensioning mechanism for a 3D printer according to an embodiment of the present disclosure.
Figure 2:
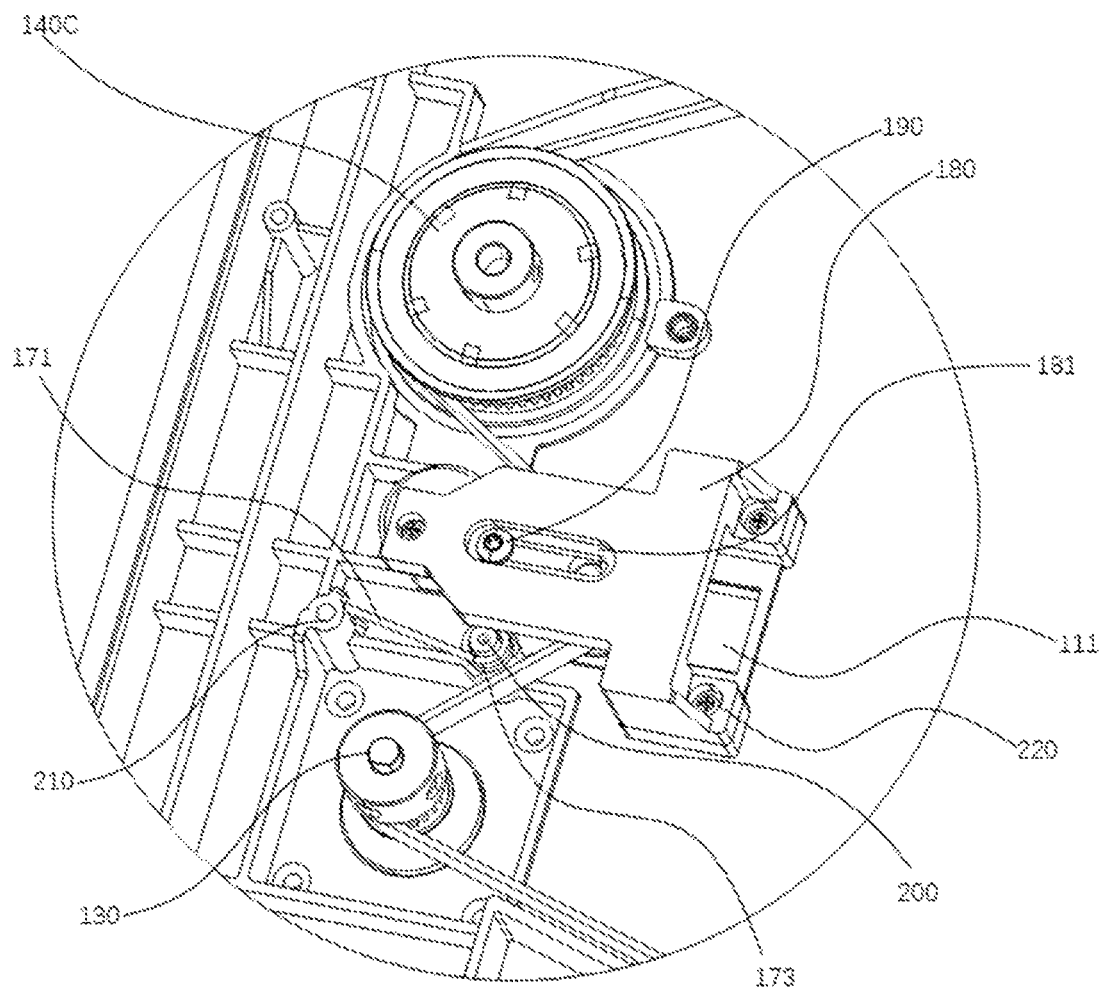
FIG. 2 is a partially enlarged view of the vicinity of the sliding block in FIG. 1 from an angle of view.
Figure 3:
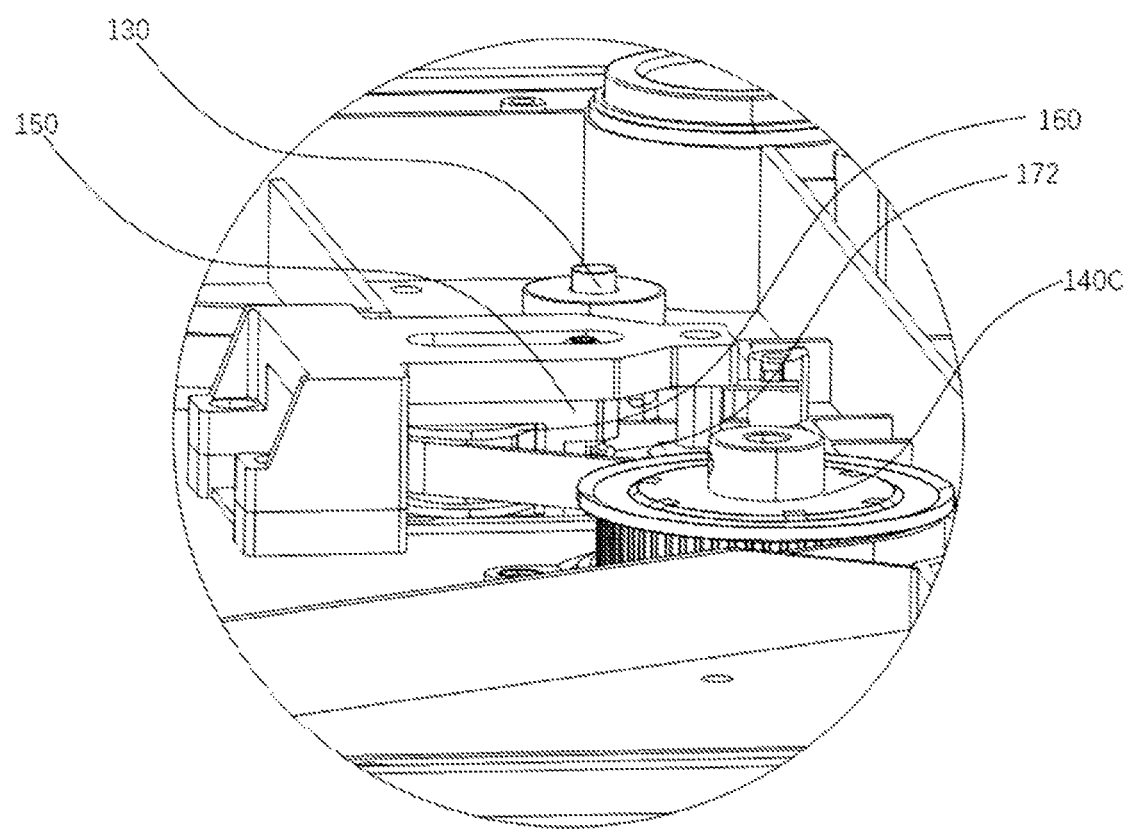
FIG. 3 is a partially enlarged view of the vicinity of the sliding block in FIG. 1 from another angle of view.

FIG. 1 shows a schematic structural diagram of a belt tensioning mechanism 10 for a 3D printer according to an embodiment of the present disclosure. FIG. 2 is a partially enlarged view of the vicinity of the sliding block in FIG. 1 from an angle of view. FIG. 3 is a partially enlarged view of the vicinity of the sliding block in FIG. 1 from another angle of view.

Referring to FIGS. 1 to 3, the belt tensioning mechanism 10 comprises: a base 110, a driving pulley 130, at least one timing pulley (the first timing pulley 140A, second timing pulley 140B, and third timing pulley 140C in the example of FIG. 1), a sliding block 150, a tensioning pulley 160, a spring 170, a tensioning pulley cover 180, and a locking screw 190. The driving pulley 130 drives the rotation of at least one timing pulley, and at least one timing pulley drives the corresponding lead screw to rotate, enabling the printing bed, which is sleeved on the lead screw, to move up and down in the vertical direction. The at least one lead screw can be mounted on the respective timing pulley in any suitable manner (e.g., threaded connection, fastening connection), as long as the at least one lead screw can move up and down in the vertical direction with the rotation of the timing pulley. In the example of FIG. 1, three lead screws (not shown), for example, may be provided, each coaxially fixed to the first timing pulley 140A, the second timing pulley 140B, and the third timing pulley 140C, respectively.

The base 110 may be a frame structure or a plate-like structure. The flat shape of the horizontal plane of the base 110 may be, for example, a square, rectangle, or circle. The base 110 is provided with a first sliding groove 111.

The driving pulley 130 and at least one timing pulley are mounted on the base 110. The positional relationship between the driving pulley 130 and the at least one timing pulley is not specifically limited. In the example of FIG. 1, the driving pulley 130 is disposed closest to the third timing pulley 140C among the first timing pulley 140A, the second timing pulley 140B, and the third timing pulley 140C. However, the present disclosure is not limited to this configuration. The driving pulley 130, the first timing pulley 140A, the second timing pulley 140B, and the third timing pulley 140C are connected in series to each other via the belt 120. Under the drive of the driving pulley 130, the first timing pulley 140A, the second timing pulley 140B, and the third timing pulley 140C each drive their respective lead screw to rotate, enabling the printing bed to move up and down along the lead screws relative to the base 110.

Referring to FIGS. 1 and 2, the belt tensioning mechanism 10 comprises a sliding block 150, a tensioning pulley 160, and a spring 170. The spring 170 applies an elastic force to the sliding block 150, and the sliding block 150 drives the tensioning pulley 160 to move, such that the tensioning pulley 160 applies a tension force to the belt 120. It should be noted that, due to the use of the spring 170 to apply an elastic force, users do not need to rely on their sense of feelings to determine the magnitude of the elastic force. This ensures that, even with different users, as long as springs 170 of the same specification are used, the same elastic force will be applied to the sliding block 150. As a result, the magnitude of the tension force applied to the belt 120 through the sliding block 150 and the tensioning pulley 160 remains relatively constant.

The sliding block 150 is mounted on the base 110 and is capable of sliding along the first sliding groove 111 of the base 110. The sliding block 150 is provided with a threaded hole. The shape of the sliding block 150 may be rectangular, but is not limited thereto. The sliding block 150 may be made of materials such as iron, copper, or plastic. In one example, the sliding block 150 is engaged with the first sliding groove 111, allowing the sliding block 150 to move only along the first sliding groove 111. In one example, the sliding block 150 does not slide off the first sliding groove 111 in the lengthwise direction of the first sliding groove 111. To achieve this, stoppers may be provided at both ends of the first sliding groove 111 in the lengthwise direction to prevent the sliding block 150 from sliding beyond the stoppers.

The tensioning pulley 160 is mounted on the sliding block 150 and is connected in series with the driving pulley 130 and the at least one timing pulley 140 via the belt 120 so as to tension the belt 120. The tensioning pulley 160 can move with the sliding block 150 as an integrated unit.

Referring to FIGS. 1 to 3, as one possible implementation, the spring 170 may be a torsion spring. The torsion spring comprises a torsion spring body 173, a first arm 171, and a second arm 172. Additionally, the base 110 comprises a torsion spring fixing post 200 and a torsion spring limiting post 210.

In this implementation, the torsion spring body 173 is sleeved on the torsion spring fixing post 200, the first arm 171 of the torsion spring abuts against the torsion spring limiting post 210, and the second arm 172 of the torsion spring abuts against the sliding block 150. When applying a tension force to the belt 120, the torsion spring applies an elastic force to the sliding block 150 through torque via the second arm 172, pushing the sliding block 150 to make the sliding block 150 at the working position within the first sliding groove 111. At this working position, the tensioning pulley 160 tensions the belt 120.

By properly positioning the torsion spring fixing post 200 and adjusting the length of the arm of the torsion spring, a constant pushing force can be maintained when the torsion spring pushes the sliding block 150 within a small range of motion. For example, as the torsion spring pushes the sliding block 150, on one hand, the working angle of the torsion spring increases, which leads to a decrease in torque of the torsion spring. On the other hand, by properly positioning the torsion spring fixing post 200 and adjusting the length of the arm of the torsion spring, the length of the arm from the contact point of the torsion spring and the sliding block 150 to the torsion spring fixing post 200 can be proportionally shortened, thereby maintaining a constant pushing force.

In some embodiments, the base 110 may not be provided with the torsion spring fixing post 200, but only with the torsion spring limiting post 210. In such embodiments, the first arm 171 of the torsion spring may be fixed to the torsion spring limiting post 210, and the second arm 172 of the torsion spring may still abut against the sliding block 150. In this case, the torsion spring can still apply an elastic force to the sliding block 150 through torque via the second arm 172.

By utilizing the torsion spring as the spring 170 to apply an elastic force to the sliding block 150, users do not need to rely on their sense of feelings to determine the magnitude of the elastic force. This ensures that, even with different users, as long as torsion springs of the same specification are used, the same elastic force will be applied to the sliding block 150. As a result, the magnitude of the tension force applied to the belt 120 by the tensioning pulley 160 remains constant.

As another possible implementation, the spring 170 of the belt tensioning mechanism 10 may be a compression spring or a tension spring. In the embodiment where the spring 170 is a compression spring, one end of the compression spring can be fixed on a compression spring fixing post (not shown), while the other end of the compression spring can be fixed on the sliding block 150. When the compression spring applies an elastic force to the sliding block 150, the compression spring is compressed to generate an elastic force, achieving a similar automatic tensioning effect to the torsion spring.

As another possible implementation, the spring 170 of the belt tensioning mechanism 10 may also be a tension spring. In the embodiment where the spring 170 is a tension spring, one end of the tension spring can be fixed on a tension spring fixing post (not shown), while the other end of the tension spring can be fixed on the sliding block 150. When the tension spring applies an elastic force to the sliding block 150, the tension spring is stretched to generate an elastic force, achieving a similar automatic tensioning effect to the torsion spring.

It can be appreciated that, compared to the case of using a torsion spring, when using a compression spring or a tension spring, the elastic force of the compression spring or the tension spring may vary within a small range when the sliding block 150 moves a small distance. While this may not achieve a constant tension force, a small range of variation in the tension force can still be achieved.

The belt tensioning mechanism 10 further comprises a tensioning pulley cover 180 and a locking screw 190. The locking screw 190 fixes the sliding block 150 relative to the tensioning pulley cover 180, ensuring that the sliding block 150 remains in the working position for a long time. This allows the sliding block 150 to apply a tension force to the belt 120 for a long time, thereby improving the stability of the tension force. Once the locking screw 190 is tightened, the sliding block 150 is locked in place. If users find that the belt tension decreases after a long time of use, they simply need to loosen the locking screw 190, then tighten the locking screw 190 again. This automatically tensions the belt 120, maintaining the tension force close to the designed value.

The tensioning pulley cover 180 is fixedly mounted on the base 110 and is provided with a second sliding groove 181 corresponding to the first sliding groove 111. The tensioning pulley cover 180 may be fixedly connected to the base 110 by a screw 220, but the connection method is not limited thereto. The locking screw 190 is used in combination with the tensioning pulley cover 180. To lock and fix the sliding block 150 relative to the tensioning pulley cover 180, the locking screw 190 passes through the second sliding groove 181 of the tensioning pulley cover 180 and is in threaded connection with the threaded hole in the sliding block 150, such that the sliding block 150 is locked and fixed relative to the tensioning pulley cover 180. During normal use, the locking screw 190 is tightened, and the locking screw 190 generates a great friction against the surface of the second sliding groove 181, locking the sliding block 150 and the tensioning pulley 160 in a fixed position. When the user needs to adjust the belt tension, the user loosens the locking screw 190, allowing the spring to push the sliding block 150 to slide, thereby making the tension force reach the designed value. Once the adjustment is complete, the user only needs to tighten the locking screw 190. It should be noted that the method for fixing and connecting the locking screw 190 to the tensioning pulley cover 180 is not limited to threading. Fixing mechanisms such as the tensioning pulley cover 180 and the locking screw 190 enable the sliding block 150 to remain in a fixed state, ensuring that the sliding block 150 can stay in the same working position for a long time, thereby improving the stability of the tension force.

The embodiments of the present disclosure further provide a 3D printer. The 3D printer comprises: at least one lead screw, a printing bed, and a belt tensioning mechanism 10 for a 3D printer. The at least one lead screw is arranged in a vertical direction, and the printing bed is sleeved on the at least one lead screw. The structure and function of the belt tensioning mechanism 10 for a 3D printer are the same as those of the above embodiments, and reference may be made to the above embodiments for details. The details will not be repeated herein.

The printing bed is sleeved on the lead screw, and the driving pulley 130 can drive the timing pulley and the lead screw to rotate, allowing the printing bed to move up and down in the vertical direction with the rotation of the lead screw. In the embodiment, the printing bed is sleeved on three lead screws, but the configuration is not limited thereto. The number of sleeved lead screws can be increased based on the user's requirements for printing precision and moving stability of the printing bed. For example, the printing bed may be sleeved on one, two, four, or more than four lead screws.

By employing the belt tensioning mechanism 10 for a 3D printer according to the embodiments described above, the issues of low precision in the vertical movement of the printing bed due to a loose belt and increased machine wear due to an overtight belt can be resolved.

In the present disclosure, unless otherwise clearly specified and defined, the terms "arrange", "link", "connect", "fasten" and the like should be comprehended in their broad sense. For example, "connect" may be "fixedly connect", "detachably connect" or "integrally connected as one"; "mechanically connect", "electrically connect" or "communicate"; "directly interconnect" or "indirectly interconnect through an intermediate"; or "the communication between the interiors of two elements" or "the interaction between two elements". For those of ordinary skill in the art, the specific meanings of the above terms in the present disclosure can be construed according to specific situations.

Unless otherwise explicitly stated or defined herein, the recitation of a first feature "on" or "under" a second feature may include the recitation of the first and second features being in direct contact, and may also include the recitation that the first and second features are not in direct contact, but are in contact via another feature between them. Moreover, a first feature "on", "above" and "over" a second feature includes a first feature being directly above and obliquely above a second feature, or simply indicates that a horizontal height of a first feature is higher than that of a second feature. A first feature "beneath", "under" and "below" a second feature includes a first feature being directly under and obliquely under a second feature, or simply indicates that a horizontal height of a first feature is smaller than that of a second feature.

The present specification provides a number of different embodiments or examples used to implement the present disclosure. It should be appreciated that such different embodiments or examples are illustrative only. Therefore, the protection scope of the present disclosure shall be subject to the protection scope defined by the appended claims.

REFERENCE NUMERALS

10: belt tensioning mechanism;
110: base;
111: first sliding groove;
120: belt;
130: driving pulley;
140A: first timing pulley;
140B: second timing pulley;
140C: third timing pulley;
150: sliding block;
160: tensioning pulley;
170: spring;
171: first arm;
172: second arm;
173: torsion spring body;
180: tensioning pulley cover;
181: second sliding groove;
190: locking screw;
200: torsion spring fixing post;
210: torsion spring limiting post;
220: screw.

The invention claimed is:

1. A belt tensioning mechanism for a 3D printer, wherein the 3D printer comprises at least one lead screw arranged in a vertical direction and a printing bed sleeved on the at least one lead screw, and the belt tensioning mechanism comprises:
a base provided with a first sliding groove;
a driving pulley and at least one timing pulley mounted on the base and connected in series with each other via a belt, wherein the at least one timing pulley is configured to drive the at least one lead screw to rotate under the driving of the driving pulley to enable the printing bed to be raised and lowered along the at least one lead screw;
a sliding block mounted on the base and capable of sliding along the first sliding groove; a tensioning pulley mounted on the sliding block, and connected in series with the driving pulley and the at least one timing pulley via the belt to tension the belt;
a spring configured to apply an elastic force to the sliding block to make the sliding block at a working position within the first sliding groove, wherein at the working position, the tensioning pulley tensions the belt;
a tensioning pulley cover fixedly mounted on the base and provided with a second sliding groove corresponding to the first sliding groove; and
a locking screw penetrating through the second sliding groove and being in threaded connection with a threaded hole in the sliding block, such that the sliding block is locked and fixed relative to the tensioning pulley cover.

2. The belt tensioning mechanism according to claim 1, wherein the tensioning pulley cover is fixedly connected to the base by a screw.

3. The belt tensioning mechanism according to claim 1, wherein the spring is a compression spring or a tension spring.

4. The belt tensioning mechanism according to claim 1, wherein the spring is a torsion spring.

5. The belt tensioning mechanism according to claim 4, wherein the base is further provided with a torsion spring fixing post and a torsion spring limiting post, wherein a torsion spring body of the torsion spring is sleeved on the torsion spring fixing post, a first arm of the torsion spring abuts against the torsion spring limiting post, and a second arm of the torsion spring abuts against the sliding block.

6. The belt tensioning mechanism according to claim 4, wherein the base is further provided with a torsion spring limiting post, wherein a first arm of the torsion spring is fixed to the torsion spring limiting post, and a second arm of the torsion spring abuts against the sliding block.

7. A 3D printer, comprising:
at least one lead screw arranged in a vertical direction;
a printing bed sleeved on the at least one lead screw;
a belt tensioning mechanism, wherein the belt tensioning mechanism comprises:
a base provided with a first sliding groove;
a driving pulley and at least one timing pulley mounted on the base and connected in series with each other via a belt, wherein the at least one timing pulley is configured to drive the at least one lead screw to rotate under the driving of the driving pulley to enable the printing bed to be raised and lowered along the at least one lead screw;
a sliding block mounted on the base and capable of sliding along the first sliding groove;
a tensioning pulley mounted on the sliding block and connected in series with the driving pulley and the at least one timing pulley via the belt to tension the belt;
a spring configured to apply an elastic force to the sliding block to make the sliding block at a working position within the first sliding groove, wherein at the working position, the tensioning pulley tensions the belt;
a tensioning pulley cover fixedly mounted on the base and provided with a second sliding groove corresponding to the first sliding groove; and
a locking screw penetrating through the second sliding groove and being in threaded connection with a threaded hole in the sliding block, such that the sliding block is locked and fixed relative to the tensioning pulley cover.

8. The 3D printer according to claim 7, wherein the tensioning pulley cover is fixedly connected to the base by a screw.

9. The 3D printer according to claim 7, wherein the spring is a compression spring or a tension spring.

10. The 3D printer according to claim 7, wherein the spring is a torsion spring.

11. The 3D printer according to claim 10, wherein the base is further provided with a torsion spring fixing post and a torsion spring limiting post, wherein a torsion spring body of the torsion spring is sleeved on the torsion spring fixing post, a first arm of the torsion spring abuts against the torsion spring limiting post, and a second arm of the torsion spring abuts against the sliding block.

12. The 3D printer according to claim 10, wherein the base is further provided with a torsion spring limiting post, a first arm of the torsion spring is fixed to the torsion spring limiting post, and a second arm of the torsion spring abuts against the sliding block.

* * * * *